(12) United States Patent
Pearl et al.

(10) Patent No.: US 8,286,956 B2
(45) Date of Patent: *Oct. 16, 2012

(54) CUTTING BOARD AND STAND

(75) Inventors: Jayson Pearl, Shorewood, WI (US);
Michael Young, Mukwonago, WI (US);
Paul A. Omdoll, Waukesha, WI (US);
Norm Faiola, Ithaca, NY (US)

(73) Assignee: The Colman Group, Inc., Elkhorn, WI (US)

( * ) Notice: Subject to any disclaimer, the term of this patent is extended or adjusted under 35 U.S.C. 154(b) by 1033 days.

This patent is subject to a terminal disclaimer.

(21) Appl. No.: 12/207,063

(22) Filed: Sep. 9, 2008

(65) Prior Publication Data

US 2009/0008851 A1    Jan. 8, 2009

Related U.S. Application Data

(63) Continuation of application No. 11/438,646, filed on May 22, 2006, now Pat. No. 7,422,201.

(60) Provisional application No. 60/683,456, filed on May 20, 2005.

(51) Int. Cl.
*B23Q 3/18* (2006.01)

(52) U.S. Cl. .................. 269/289 R; 269/302.1

(58) Field of Classification Search .............. 269/289 R, 269/302.1, 900
See application file for complete search history.

(56) References Cited

U.S. PATENT DOCUMENTS

| | | |
|---|---|---|
| 693,627 A | 2/1902 | Sharp |
| D159,881 S | 8/1950 | Zekowski |
| D161,596 S | 1/1951 | Russ |
| 2,609,024 A | 9/1952 | Russ |
| 2,796,902 A | 6/1957 | Mercury |
| 3,598,164 A | 8/1971 | August |
| 4,041,964 A | 8/1977 | Shamoon |
| D281,850 S | 12/1985 | Morin |
| D283,777 S | 5/1986 | Morin |
| 4,653,737 A | 3/1987 | Haskins et al. |
| 4,907,789 A | 3/1990 | Tice |
| 5,363,755 A | 11/1994 | Liang |
| 5,366,208 A | 11/1994 | Benjamin |
| 5,527,022 A | 6/1996 | Gibson |
| D374,380 S | 10/1996 | Sawatsky |
| D381,564 S | 7/1997 | Kolada |
| 5,865,105 A | 2/1999 | Pepelanov |
| 6,276,675 B1 | 8/2001 | Shamoon |
| 6,422,551 B1 | 7/2002 | Brotz |
| D472,776 S | 4/2003 | Porter |
| 6,715,748 B2 | 4/2004 | Thompson et al. |
| D491,412 S | 6/2004 | Devine |
| 6,789,792 B1 | 9/2004 | Angland |
| 6,932,336 B1 | 8/2005 | Nudo |
| 7,422,201 B2 * | 9/2008 | Pearl et al. ............... 269/289 R |
| 2002/0195763 A1 | 12/2002 | Benjamin |
| 2003/0218290 A1 | 11/2003 | Goldberg et al. |
| 2004/0119220 A1 | 6/2004 | Davis |
| 2004/0119221 A1 | 6/2004 | Davis |
| 2007/0001359 A1 * | 1/2007 | Pearl et al. ............... 269/289 R |
| 2009/0008851 A1 * | 1/2009 | Pearl et al. ............... 269/289 R |

* cited by examiner

*Primary Examiner* — Lee D Wilson

(74) *Attorney, Agent, or Firm* — Boyle Fredrickson, S.C.

(57) ABSTRACT

A device for preparing food includes a stand having a plurality of legs for supporting at least one cutting board and lifting it off a work surface. The cutting board has a hole in it. A pan fits in or underneath the hole to catch juices, scraps or finished cut items cut on the cutting board.

4 Claims, 10 Drawing Sheets

CUTTING BOARD AND STAND

CROSS-REFERENCE TO RELATED APPLICATIONS

This application is a continuation of U.S. patent application Ser. No. 11/438,646, filed May 22, 2006 and now U.S. Pat. No. 7,422,201, which claims priority under 35 U.S.C. §119 (e) to U.S. Provisional Application Ser. No. 60/683,456, filed May 20, 2005.

FIELD OF THE INVENTION

This invention relates generally to food preparation and more particularly to cutting boards used in the preparation of food.

BACKGROUND OF THE INVENTION

In commercial kitchens, maintaining sanitary conditions is of critical importance. This can be difficult where counter space as it a premium and significant preparation involving cutting needs to be undertaken. Limited space increases the risk of cross contamination where, for example, poultry and vegetables are both being cut on contiguous or substantially contiguous surfaces. Generally, thick plastic cutting boards are employed that raise the cutting surface off the counter on which the cutting boards are placed from about ¼ of an inch to about ¾ of an inch. This minimal height difference makes it more likely than not that material (germs, chemicals, particulate matter, etc.) will be transferred to or from the cutting board to or from the counter.

Often, when cutting is done, scrap is created. The scrap is typically piled up on the cutting board or periodically thrown into a nearby trash receptacle. Where the scrap is piled up on the cutting board, the space necessary to cut is diminished and the possibility of the scrap becoming intermingled with the material to be used is quite high. Where the scrap is thrown into a nearby trash receptacle, floor space may be compromised by having to station the receptacle nearby and additional handling of scrap material is required that could increase the risk of sanitation issues.

When the object being cut is juicy, the risks increase still further. Juices can run randomly off the cutting board onto the counter and the floor creating numerous hazardous conditions.

Finally, the placement of cutting boards on typical height countertops forces food preparation workers to have bend over to perform their tasks. This creates the possibility of back injuries, makes it more difficult to see what is being cut and contributes to a more hazardous and less ergonomic work environment.

As can be seen, current cutting boards suffer from certain drawbacks and limitations. Accordingly, a need exists for cutting boards that are designed to address the drawbacks and limitations in a cost-effective manner

SUMMARY OF THE INVENTION

In one preferred embodiment, the present invention comprises one or more cutting boards mounted on a stand. The cutting board(s) are thus, raised off the counter or other work surface. This accomplishes a number of things. First, it places the cutting board at a more comfortable height for cutting while bringing the work surface closer to the user's eyes for greater visual acuity. Second, it permits the placement of one or more pans in or beneath the cutting board(s) to catch scraps or juice or hold sauces or other accompaniments for service. Third, it permits full pans of scrap or juice to be removed without having to displace the cutting board. And fourth, it helps avoid contamination with other things that may also be on the counter.

Preferably, the cutting boards of the present invention have a hole therein through which waste materials can be dropped. When the cutting board is supported on a stand that lifts the cutting board off the work surface, waste materials can be pushed through the hole directly into a catch pan mounted in or below the cutting board. Alternatively, the cutting board, with or without a supporting device, can be extended over the end of the counter, placed on a trash receptacle or extended over a sink having a garbage disposal so as to make disposal of scrap juice and materials through the hole even simpler.

In one preferred embodiment, the cutting board has at least one set of grooves cut into at least one side that can catch juices and carry them to a pan mounted in or underneath the cutting board. The collected juices can then either be discarded or used for or as a sauce. Preferably at least one set of grooves are sized to match the dimensions of a pan such that the cutting board can be mounted directly on top of a conventional pan without the need for a separate stand.

These and other objects and advantages of the present invention will become apparent from the detailed description, claims, and accompanying drawings.

DETAILED DESCRIPTION OF THE PREFERRED EMBODIMENTS

Figure 1:
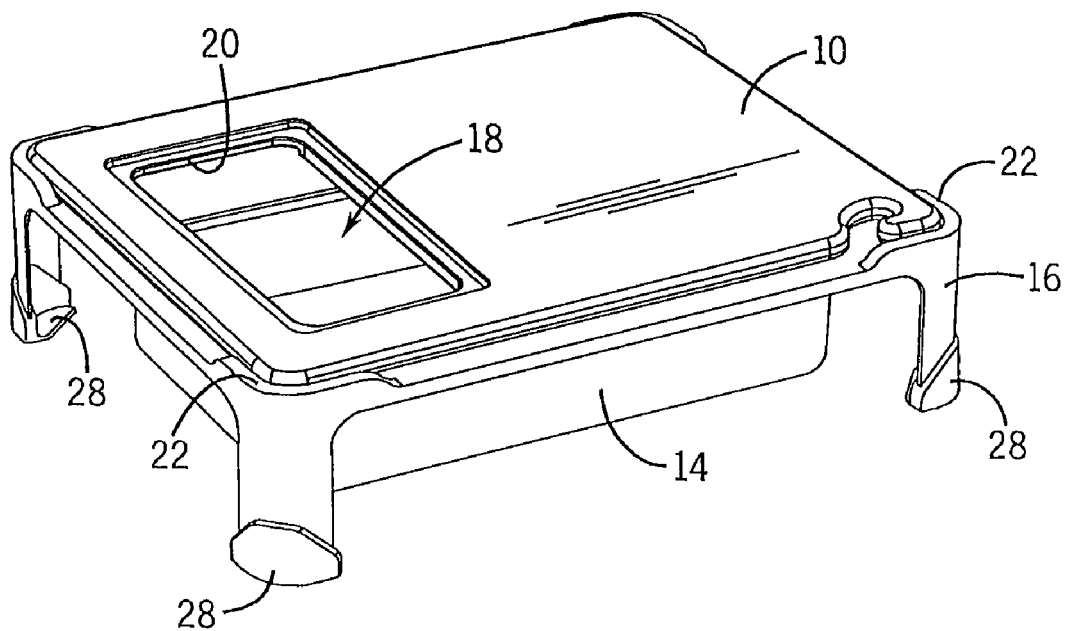
FIG. 1 is a top perspective view of one embodiment of a cutting board, stand and pan in accordance with the present invention.
Figure 2:
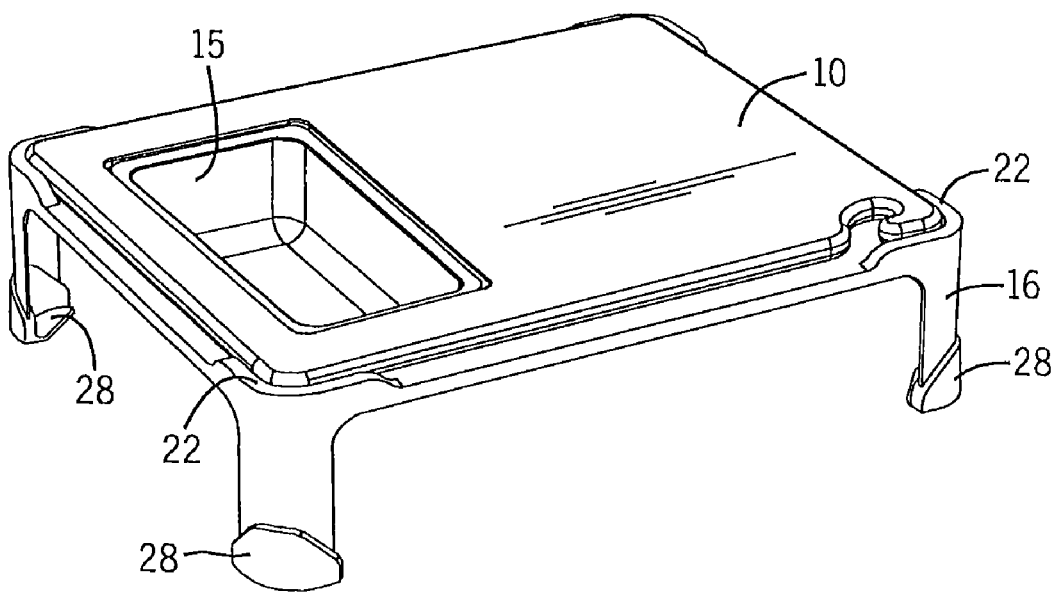
FIG. 2 is a top perspective view of a second embodiment of a cutting board, stand and pan in accordance with the present invention.

As shown in FIGS. 1-13, various embodiments of the present invention comprise one or more cutting boards 10 and 12, a pan 14, 15 or 17 and a stand 16. Preferably each cutting board 10, 12 has a hole 18 that corresponds, at least in part, to a hole or cutout 19 in the stand 16. However, since the cutting boards of the present invention can be used without the stand 16, the hole 18 can be made any size that permits juices and/or cutting scraps to be moved therethrough.

Preferably the hole in each cutting board has a recessed lip 20 to accommodate the insertion of one or more pans 15. When a pan 15 is placed in the hole, the pan's peripheral edge 15 engages the recessed lip 20 of the cutting board such that the pan's peripheral edge is even with or below the top surface of the cutting board to facilitate the transfer of juices and or cutting scraps into the pan 15.

Figure 12:
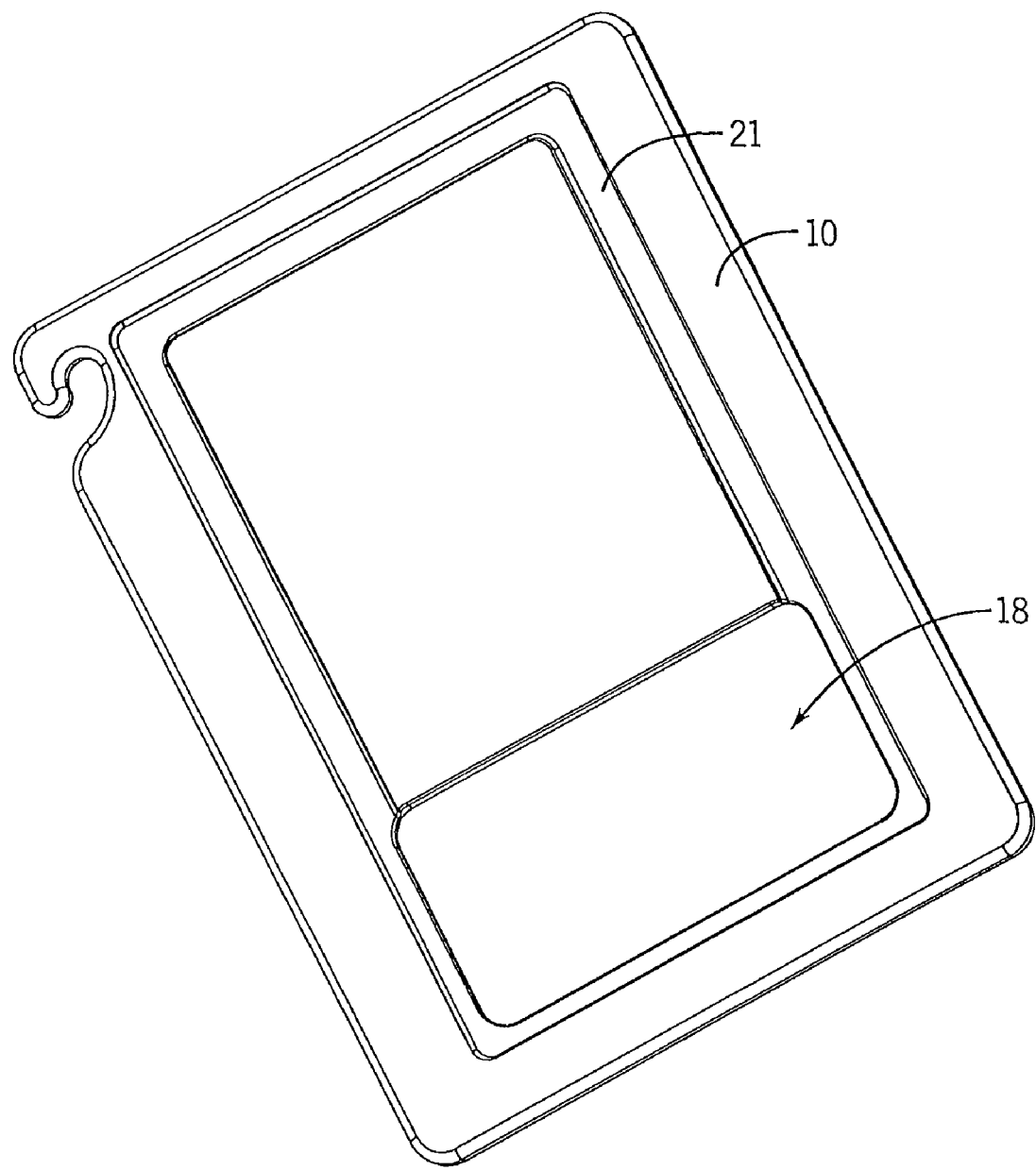
FIG. 12 is a top perspective view of one side of a cutting board made in accordance with one embodiment of the present invention.

As shown in FIG. 12, the cutting boards 10 and 12 of the present invention may also include at least one set of channels or grooves 21 (See FIG. 12) on one or both sides to guide juices from the cutting board to the hole 18 so that the juices can run into a pan 15 placed in the hole 18 or a pan 14 placed below the cutting board as shown in FIG. 1. Preferably, the grooves 21 are recessed into the cutting board at a level above the recessed lip 20 to permit juices to flow freely into a pan 15 if one is placed in the hole 18. If desired, the grooves 21 can be cut an increasing depth towards hole 18 to more readily insure the flow of juices towards the hole 18.

Figure 13:
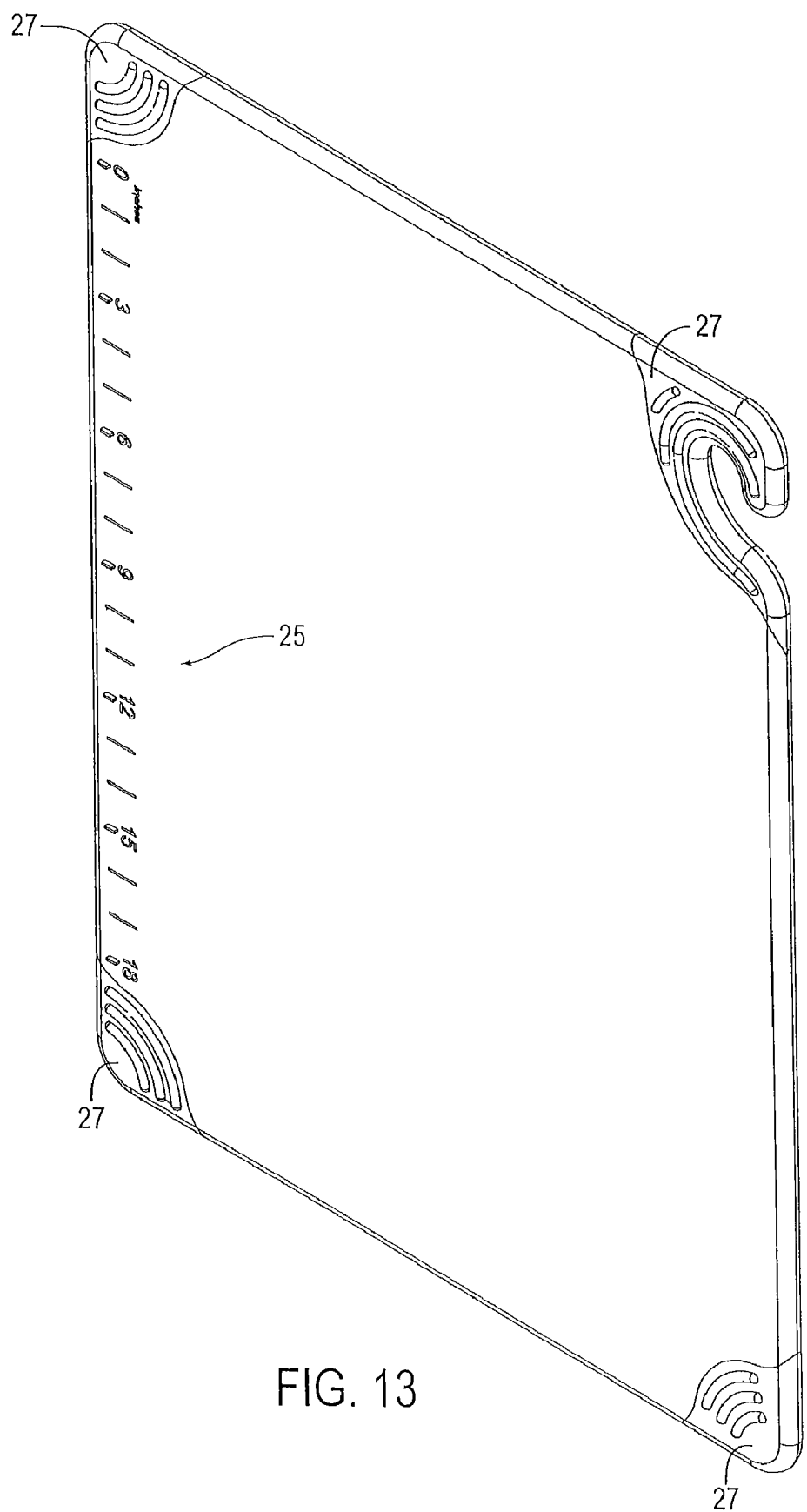
FIG. 13 is a perspective view of one side of yet another embodiment of a cutting board made in accordance with the present invention.

The cutting boards 10, 12 of the present invention also preferably include a hook 23 in one corner so that they can be hung on a rack when not in use. As shown in FIG. 13, they may also include an embedded measuring tool 25 and corners 27 with gripping surfaces.

Figure 3:
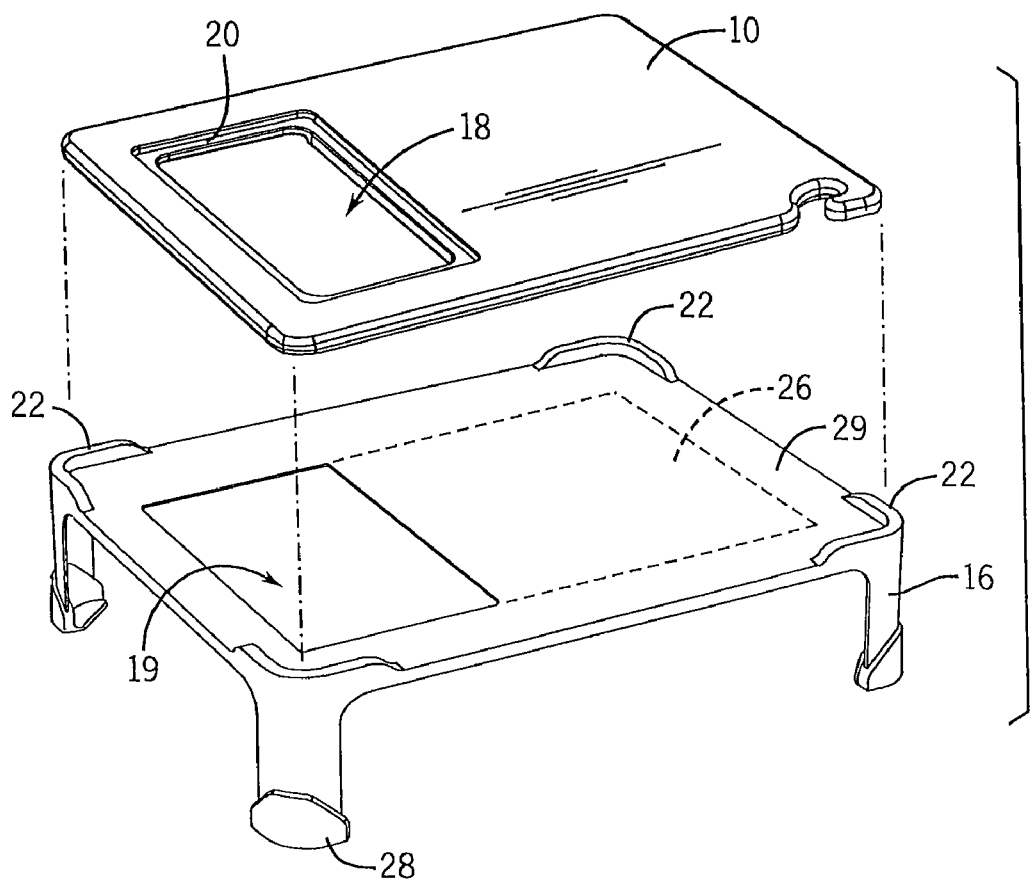
FIG. 3 is an exploded top perspective view of the embodiment of FIG. 1, without the pan.
Figure 4:
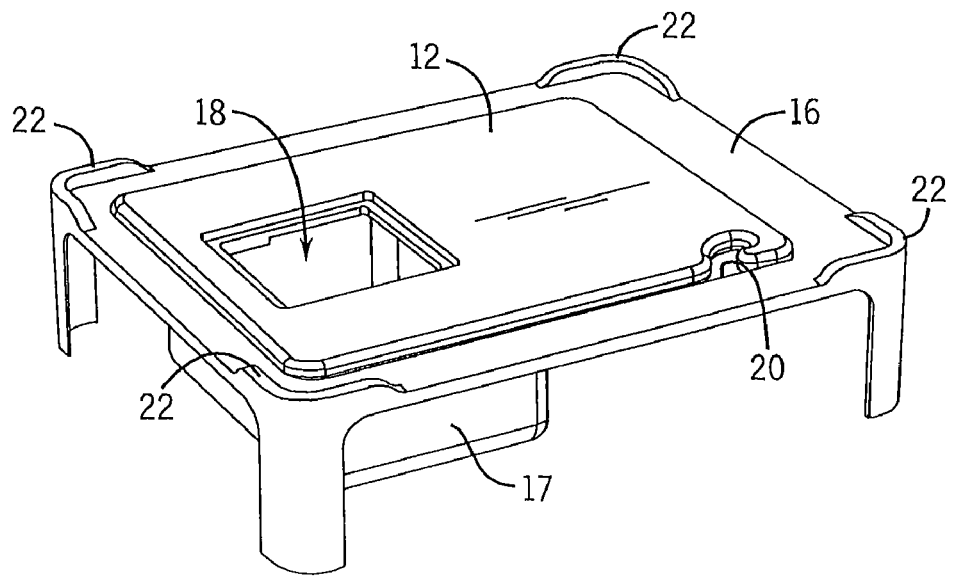
FIG. 4 is a top perspective view of a third embodiment of the present invention with a pan underneath.
Figure 5:
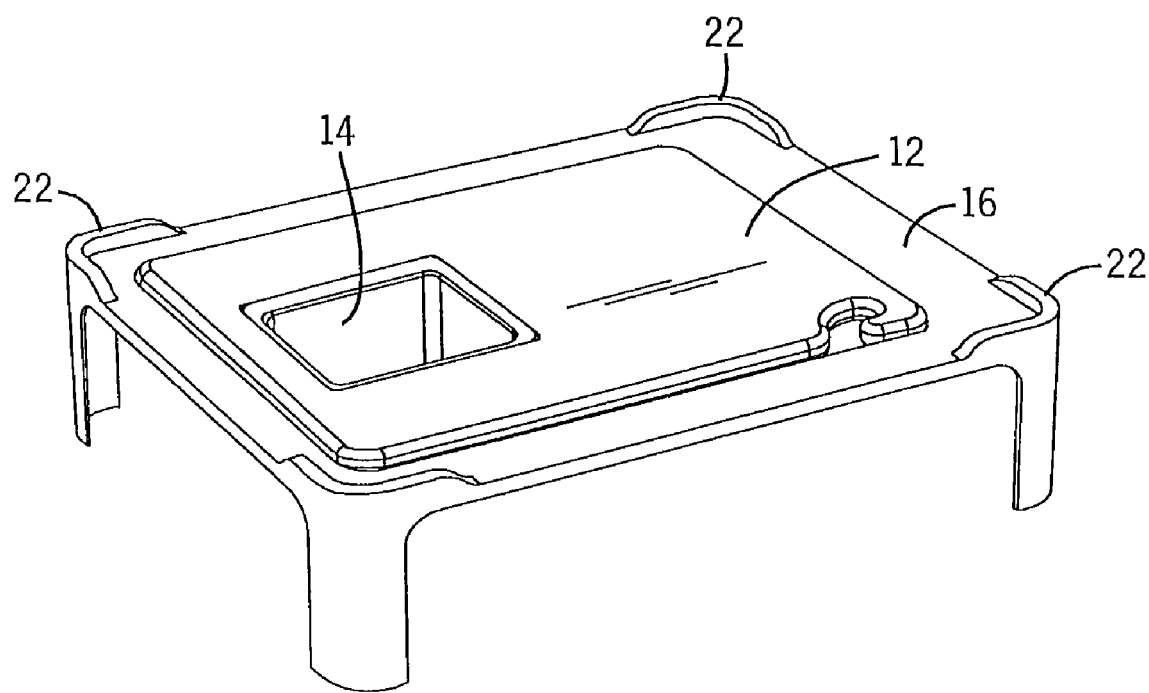
FIG. 5 is a top perspective view of the embodiment of FIG. 4 with a pan dropped into the hole in the cutting board and without the pan underneath.
Figure 6:
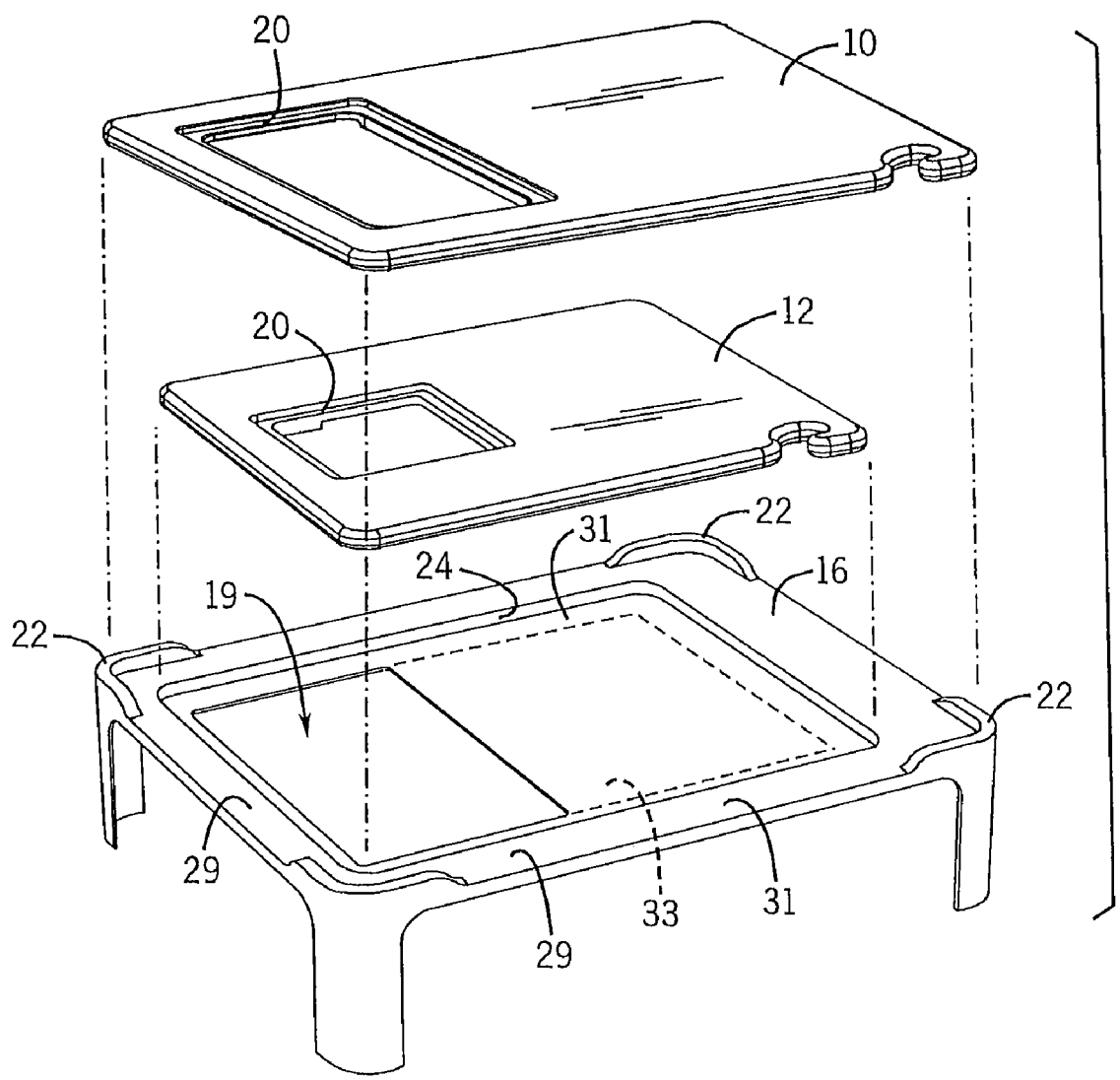
FIG. 6 is an exploded top perspective view of a fourth embodiment of the present invention.
Figure 7:
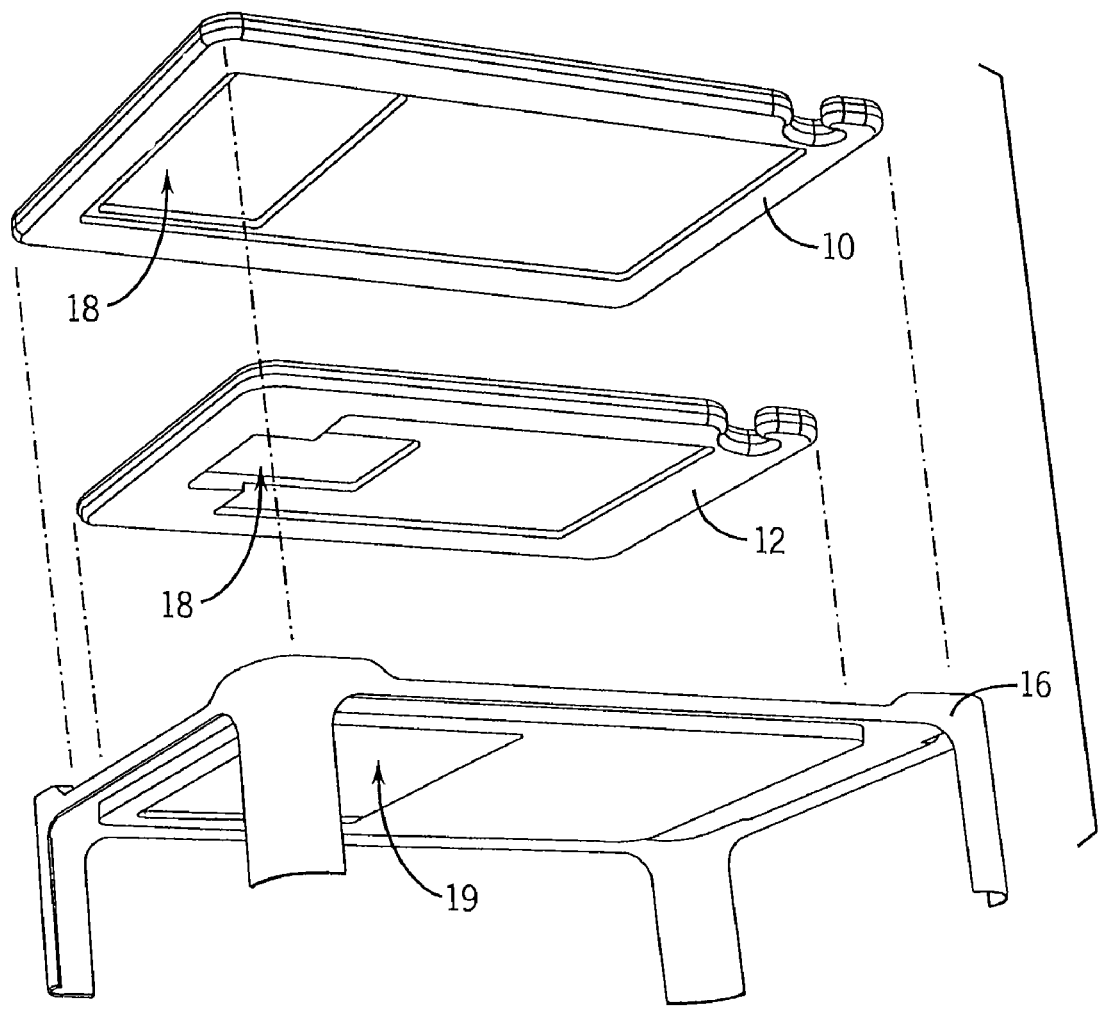
FIG. 7 is a bottom exploded perspective view of the embodiment of FIG. 7.
Figure 8:
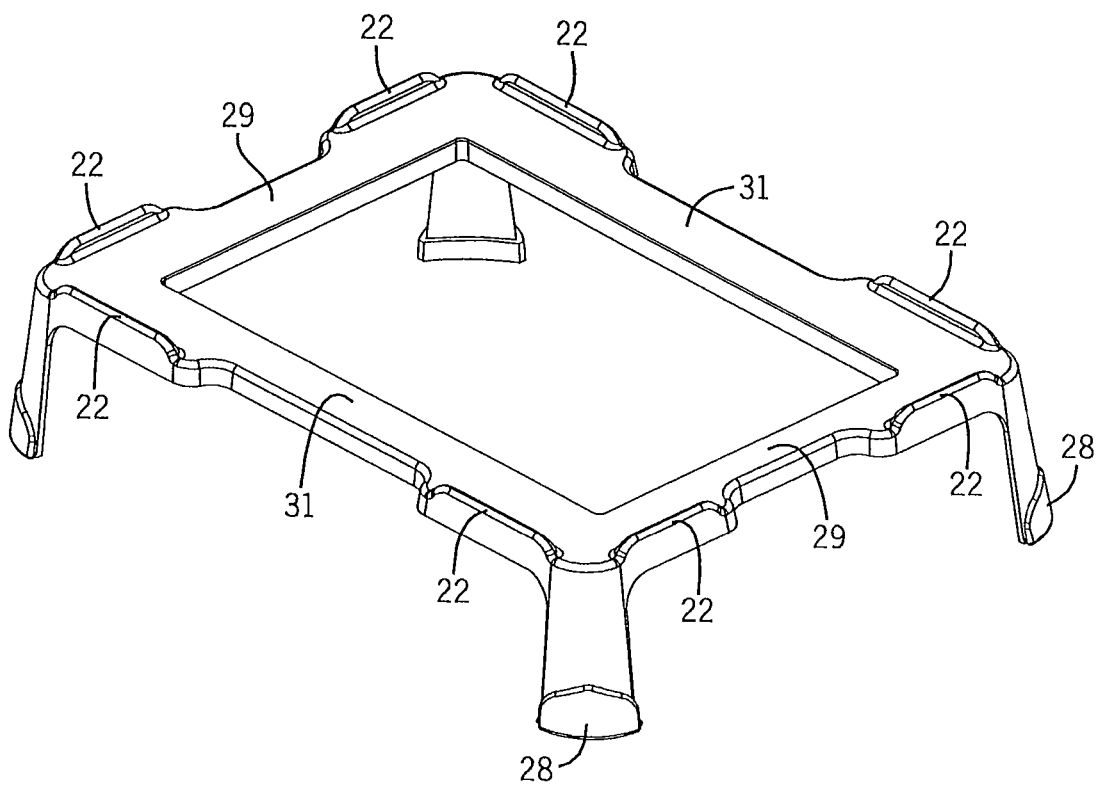
FIG. 8 is a perspective view of one embodiment of a stand used in accordance with the present invention.
Figure 9:
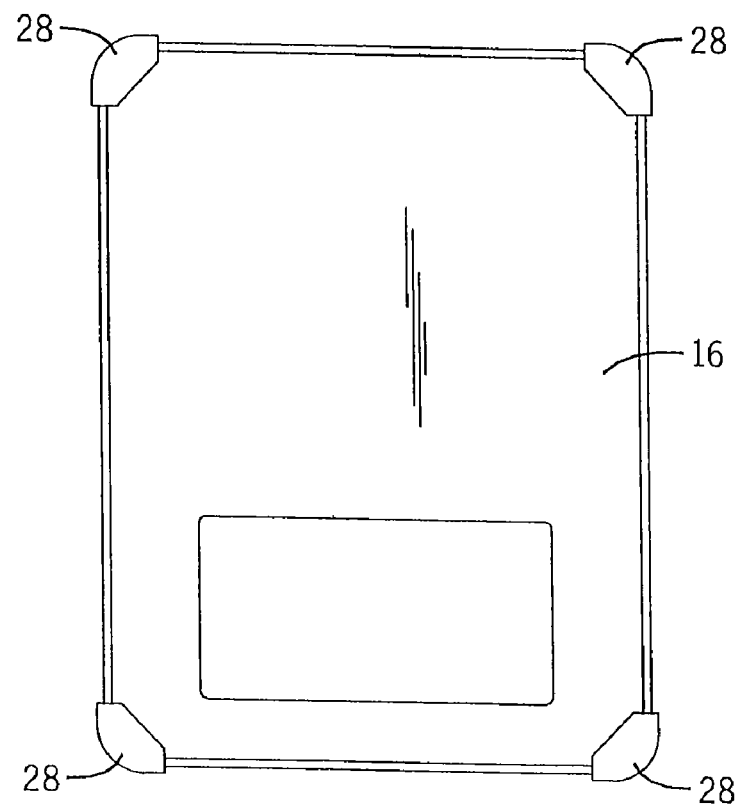
FIG. 9 is a bottom plan view of a second embodiment of a stand used in accordance with the present invention.
Figure 10:
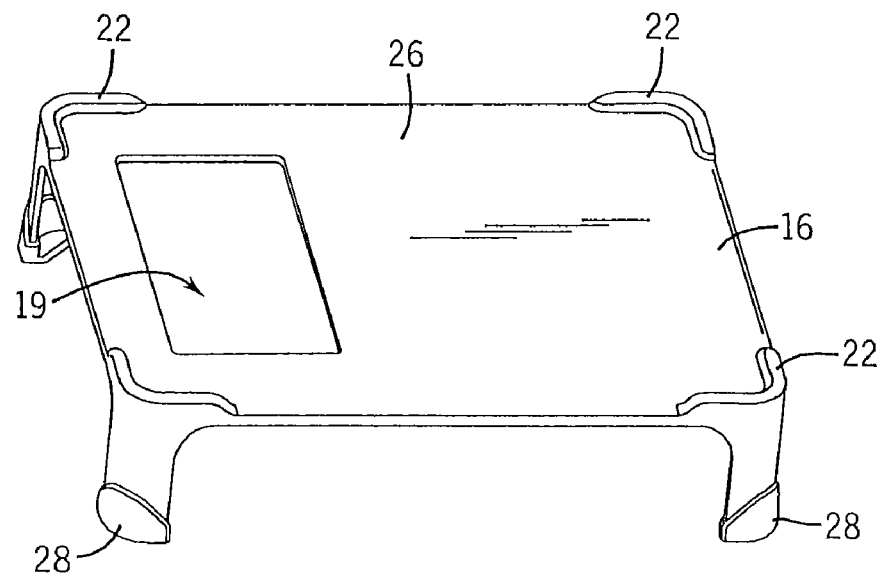
FIG. 10 is a top perspective view of the stand of FIG. 9.
Figure 11:
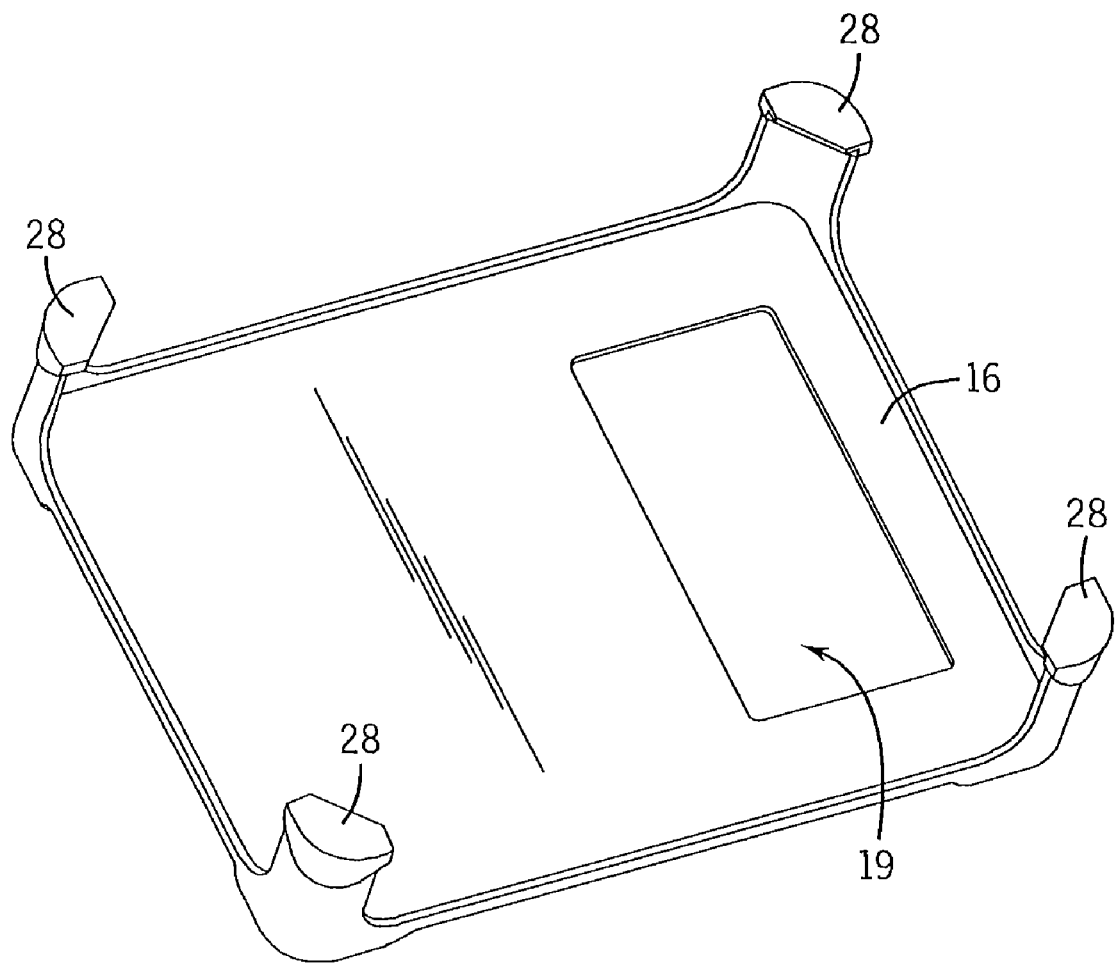
FIG. 11 is bottom perspective view of the stand of FIG. 9.

As shown in FIGS. 1-11, the stand 16 of the present invention comprises a plurality of support legs 17 preferably having feet 28 that are made from a non-slip material so that the stand does not move when cutting is being done. The stand 16 preferably has retaining lips 22 and/or edges 24 (see FIGS. 6 and 8) to hold the cutting board(s) 10 and 12 in place. As shown in FIGS. 3, 6 and 8, in another embodiment of the present invention, the majority of the beds 26 and 33 of the stand 16 can be omitted leaving relatively narrow support bands 29 and 31 to support the cutting board 10.

Alternatively, the stand can include pegs (not shown) that fit into corresponding holes (not shown) in the cutting boards 10 and 12 or other similar retaining means. Or still further, the beds 26 and 33 or support bands 29 and 31 of the stand 16 may be made from a non-slip material.

In yet another embodiment of the present invention, the grooves 21 are sized to match the top edges of a pan 14. In this way, the cutting board 10 can be placed directly on the pan 14 without the use of stand. In this way, without the use of a stand 16, juices and/or scrap material can be slid directly through hole 18 into the pan 14.

While the use of pans 14, 15 and 17 is facilitated by the use of a stand 16, the cutting boards 10 and 12 of the present invention can be placed directly over a trash receptacle, hung over the edge of a counter or maintained over a sink (preferably a sink with a garbage disposal) so that scrap juices and materials can be simply slid off the cutting board and through the hole for direct disposal. In such cases, where commercial sized cutting boards are used (typically at least ¾ of an inch thick with a 18 inch by 24 inch footprint) the cutting board weighs enough and is stable enough to extend a significant distance off a counter top in cantilever fashion without tipping. However, where tipping is a concern, the cutting board can be weighted at one end or simply clamped in place. Alternatively, a stand can be created with a cantilever or with appropriate hooks (not shown) to extend out over the end of the counter or to fit tightly on the sink or trash receptacle.

The present invention may be implemented in a variety of configurations, using certain features or aspects of the several embodiments described herein and others known in the art. Thus, although the invention has been herein shown and described in what is perceived to be the most practical and preferred embodiments, it is to be understood that the invention is not intended to be limited to the specific features and embodiments set forth above. Rather, it is recognized that modifications may be made by one of skill in the art of the invention without departing from the spirit or intent of the invention and, therefore, the invention is to be taken as including all reasonable equivalents to the subject matter disclosed herein.

We claim:

1. An apparatus, comprising:
   a stand having a plurality of support members for supporting the stand, the stand further having a planar surface with an opening formed therein and a raised lip defining an outer edge of the planar surface of the stand; and
   a cutting board configured to be seated on the planar surface and having an opening that aligns with the opening in the planar surface of the stand.

2. The apparatus of claim 1 wherein the raised lip has at least two opposing cut outs that allow a user to engage a side of the cutting board when the cutting board is seated on the planar surface to lift the board away from the planar surface.

3. The apparatus of claim 1 wherein the plurality of support members include a plurality of downwardly extending legs.

4. The apparatus of claim 1 further comprising a container that sits in the openings and is supported by the cutting board.

* * * * *